July 21, 1953    A. BOSCHI    2,646,308
RESILIENT WHEEL FOR VEHICLES ROLLING ON RAILS
Filed Feb. 19, 1948
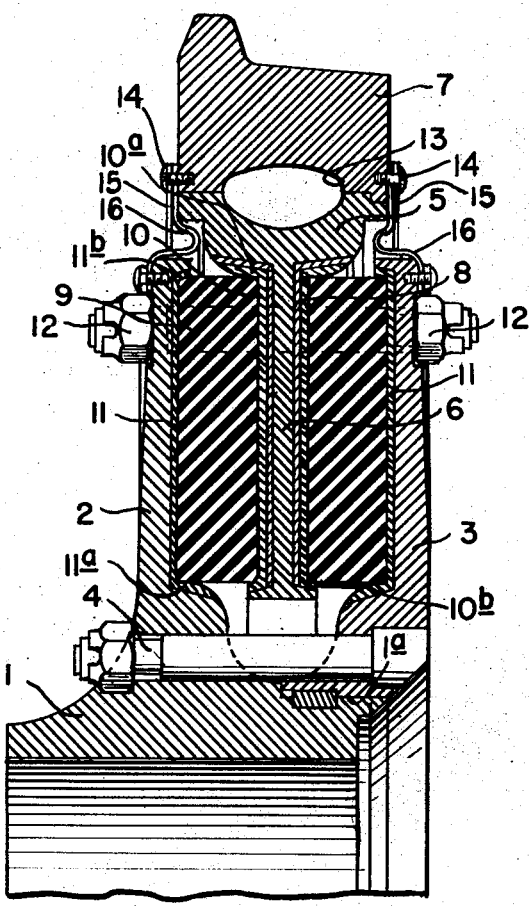
Inventor.
Antonio Boschi.
By Stone, Boyden & Mask
Attorneys.

Patented July 21, 1953

2,646,308

UNITED STATES PATENT OFFICE 2,646,308

RESILIENT WHEEL FOR VEHICLES ROLLING ON RAILS

Antonio Boschi, Milan, Italy, assignor to Pirelli Societa per Azioni, Milan, Italy, a corporation of Italy Application February 19, 1948, Serial No. 9,604
In Italy April 5, 1943

Section 1, Public Law 690, August 8, 1946
Patent expires April 5, 1963

6 Claims. (Cl. 295—11)

This invention pertains to resilient wheels for rail vehicles and more particularly has reference to such wheels in which rubber cushions are held between metal discs, alternately connected to the rim or hub of the wheel, so as to stress the cushions in shear-flexion when the wheel operates under load.

Heretofore, resilient wheels of the type mentioned have been attended with two serious disadvantages, namely: (1) the deformability of the rubber cushions was not properly graduated to increasing loads, and particularly to loads of exceptional magnitude so that those cushions failed to adequately absorb exceptionally large shocks; and (2) the heat generated by the application of brakes to the rim of the wheel found its way to the rubber cushions and exerted a deleterious effect upon the rubber.

An object of this invention is to provide an improved resilient wheel in which the deformability of the rubber cushions is properly graduated to increasing loads so that exceptional shocks are adequately absorbed without reducing the resiliency of the wheel under light loads.

Another object of this invention is to provide an improved resilient wheel wherein the rubber cushions are protected from heat of brake friction by thermal insulation, thereby increasing the useful life of the rubber.

With these and other objects in view which may be incident to my improvements, my invention consists in the combination and arrangement of elements hereinafter described and illustrated in the accompanying drawing which shows a radial cross-section of a wheel embodying my invention.

In the drawing the reference numeral 1 denotes the hub of a rail vehicle which having an integral, radially-extending flange 2 and an opposite seat 1a whereon is mounted a detachable, annular disc 3 which is bolted to hub 1 and flange 2 respectively, by a series of circumferentially spaced bolts 4 and 12. Centrally located between flange 2 and disc 3 is an annular web member 6 which is outwardly enlarged to form a seat 5 for the rim 7 of the wheel. Rim 7 is permanently attached to web 6 by forcing and shrinking it on seat 5.

The inner faces of flange 2 and disc 3 are formed with a series of circumferentially spaced cavities in which are seated similarly shaped pans 11. On each side of web 6 is a like series of cavities for the reception of a corresponding number of similarly shaped pans 10. The cavities in web 6 are, however, deeper than those in flange 2 and disc 3, in order to accommodate the thickness of thermal insulating pads 8 which are inserted between pans 10 and web 6. Between each pair of pans 10 and 11 is inserted a rubber cushion 9 two opposite faces of which are bonded thereto by vulcanization.

The outer ends 10a of pans 10 and the inner ends 11a of pans 11 are specially shaped and contoured so as to suitably graduate the deformability of rubber cushions 9 as web 6 is progressively depressed by increasing load on the wheel. As web 6 is so depressed the upper ends of cushions 9 increasingly contact and follow the contours of pans 10a while the lower ends of cushions 9 do the same with respect to pans 11a. At the same time, as web 6 descends under increasing load, with reference to flange 2 and disc 3, the contoured surfaces 10a and 11a gradually decrease the horizontal distances between the center of gravity of the load applied to each cushion 9 and the center of its reactive support. This operates to progressively reduce the section of each rubber cushion 9 that is still free to deform in shear-flexion. In this manner the resistance of rubber cushions 9 increases as the load increases, thereby enabling said cushions to adequately absorb the shocks of exceptionally heavy loads and impacts without reducing the deformability of said cushions, and hence the resiliency of the wheel, under light loads.

During the assembly of the wheel, cushions 9 are subjected to a transverse compression of any desired degree by properly tightening bolts 4 and 12, so as to furnish adequate lateral stability to the wheel when in operation. Between rim 7 and its seat 5 there is provided a large circumferential channel 13, which may be connected to the outside air by a suitable number of openings, for the circulation of cooling air between rim 7 and seat 5 when the wheel is in motion. The circulation of air through channel 13 dissipates much of the heat generated by the application of brakes to rim 7 and prevents this heat from flowing to cushions 9. The flow of heat from rim 7 to cushions 9 is also further inhibited by the thermal insulating pads 8.

Flexible metallic conduits 16 attached by screws 14 to rim 7 and flange 2 and disc 3 provide for an electric circuit through the wheel, while annular sheet metal plates 15 attached to rim 7 serve to exclude dirt from the interior of the wheel.

The material employed for the resilient cushions is preferably natural or synthetic rubber, but may be any other suitable material having similar properties. Likewise the thermal insulating pads 8 may be of any suitable thermal insulating material, as for example, asbestos board.

While I have shown and described the preferred embodiment of my invention I desire it to be understood that I do not limit myself to the precise details of construction disclosed by way of illustration, as these may be changed and modified by those skilled in the art without departing from the spirit of my invention or exceeding the scope of the appended claims.

I claim:

1. A resilient wheel for rail vehicles comprising a hub having a plurality of radially-extending annular flanges, a rim having an inwardly extending annular web member between said flanges, a plurality of rubber cushions interposed between said flanges and said web member and adapted to transmit a load from said hub to said rim by shear-flexon stress, and means for progressively reducing the deformability of said cushions as said load increases; said means comprising a plurality of similarly but oppositely contoured metal surfaces, arranged to progressively contact diagonally opposite inner and outer circumferential surfaces of said rubber cushions, as said load increases, whereby the axial space between said metal surfaces in which said rubber cushions are free to deform, is correspondingly reduced as said load increases.

2. A resilient wheel as in claim 1, wherein the means for progressively reducing the deformability of said rubber cushions are separated by a space sufficient to permit said cushions to deform at a decreasing rate as said load increases.

3. A resilient wheel as in claim 1, in which each rubber cushion is bonded at each of two opposite faces to a metal pan and each of said pans is held in an opposite cavity in said flanges and said web member.

4. A resilient wheel as in claim 1, in which each rubber cushion is bonded at each of two opposite faces to a metal pan and each of said pans has a contoured end adapted to progressively increase the surface of contact with said rubber cushion as said load increases.

5. A resilient wheel as in claim 1, in which said flanges and said web member are each provided with a series of oppositely disposed cavities, each rubber cushion is bonded at each of two opposite faces to a metal pan, each of said pans is located in an opposite cavity in said flanges and said web member, and a thermal insulating pad is interposed between each pan and cavity in said web member.

6. A resilient wheel as in claim 1, in which a circular air cavity communicating with the outside atmosphere is provided between the abutting circumferences of said rim and web member for the circulation of cooling air therebetween.

ANTONIO BOSCHI.

References Cited in the file of this patent

UNITED STATES PATENTS

| Number | Name | Date |
|---|---|---|
| 1,354,466 | Clark | Oct. 5, 1920 |
| 1,486,442 | Lord | Mar. 11, 1924 |
| 1,884,780 | MacLean | Oct. 25, 1932 |
| 2,126,169 | Brownyer | Aug. 9, 1938 |
| 2,222,337 | Gordon | Nov. 19, 1940 |
| 2,239,077 | Burton | Apr. 22, 1941 |
| 2,244,633 | Saurer | June 3, 1941 |
| 2,263,884 | Malmquist | Nov. 25, 1941 |
| 2,310,486 | Zintsmaster | Feb. 9, 1943 |
| 2,450,672 | MacLean | Oct. 5, 1948 |

FOREIGN PATENTS

| Number | Country | Date |
|---|---|---|
| 390,953 | Great Britain | Apr. 20, 1933 |